US007079206B2

(12) United States Patent
Ha

(10) Patent No.: US 7,079,206 B2
(45) Date of Patent: *Jul. 18, 2006

(54) COLOR FILTER SUBSTRATE FOR TRANSFLECTIVE LIQUID CRYSTAL DISPLAY DEVICE WITH PARTICULAR DIFFUSIVE BUFFER LAYERS AND METHOD OF MANUFACTURING THE SAME

(75) Inventor: Kyoung-Su Ha, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 8 days.

This patent is subject to a terminal disclaimer.

(21) Appl. No.: 10/254,638

(22) Filed: Sep. 26, 2002

(65) Prior Publication Data

US 2003/0160914 A1    Aug. 28, 2003

(30) Foreign Application Priority Data

Feb. 26, 2002    (KR) ............................... 2002-10165

(51) Int. Cl.
*G02F 1/1335* (2006.01)
(52) U.S. Cl. ...................................... 349/114
(58) Field of Classification Search ................ 349/114, 349/106, 112, 113
See application file for complete search history.

(56) References Cited

U.S. PATENT DOCUMENTS

| 6,580,480 B1* | 6/2003 | Baek et al. .................. 349/114 |
| 6,801,276 B1* | 10/2004 | Epstein et al. .............. 349/112 |
| 6,809,791 B1* | 10/2004 | Yi et al. ...................... 349/160 |
| 2002/0033918 A1* | 3/2002 | Shigeno et al. ............. 349/114 |
| 2002/0101552 A1* | 8/2002 | Yi et al. ...................... 349/106 |
| 2005/0046769 A1* | 3/2005 | Yi et al. ...................... 349/106 |

* cited by examiner

*Primary Examiner*—Frank G. Font
*Assistant Examiner*—Timothy Rude
(74) *Attorney, Agent, or Firm*—McKenna Long & Aldridge LLP

(57) ABSTRACT

A color filter substrate for a transflective liquid crystal display device increases a viewing angle and has no color difference in transmissive and reflective modes. A color filter substrate for a transflective liquid crystal display device includes a substrate having a transmissive area and a reflective area; a black matrix on the substrate; a buffer layer on the black matrix, wherein the buffer layer corresponds to the reflective area; a color filter on the buffer layer; and a common electrode on the color filter.

20 Claims, 6 Drawing Sheets

COLOR FILTER SUBSTRATE FOR TRANSFLECTIVE LIQUID CRYSTAL DISPLAY DEVICE WITH PARTICULAR DIFFUSIVE BUFFER LAYERS AND METHOD OF MANUFACTURING THE SAME

This application claims the benefit of Korean Patent Application No. 2002-10165, filed on Feb. 26, 2002 in Korea, which is hereby incorporated by reference for all purposes as if fully set forth herein.

BACKGROUND OF THE INVENTION

1. Field of the Invention

The present invention relates to a liquid crystal display (LCD) device and more particularly, to a color filter substrate for a transflective liquid crystal display (LCD) device and a method of manufacturing the same.

2. Discussion of the Related Art

In general, the liquid crystal display (LCD) device includes two substrates, which are spaced apart and facing each other, and a liquid crystal layer interposed between the two substrates. Each of the substrates includes an electrode and the electrodes of each substrate are also facing each other. Voltage is applied to each electrode and an electric field is induced between the electrodes. An alignment of the liquid crystal molecules is changed by varying the intensity of the electric field. The LCD device displays a picture by varying transmittance of the light according to the arrangement of the liquid crystal molecules.

Because the liquid crystal display (LCD) device is not luminescent, it needs an additional light source in order to display images. The liquid crystal display device is categorized into a transmissive type and a reflective type depending on the kind of light source.

In the transmissive type, a backlight behind a liquid crystal panel is used as a light source. Light incident from the backlight penetrates the liquid crystal panel, and the amount of the transmitted light is controlled depending on the alignment of the liquid crystal molecules. Here, the substrates are usually transparent and the electrodes of each substrate are usually formed of transparent conductive material. As the transmissive liquid crystal display (LCD) device uses the backlight as a light source, it can display a bright image in dark surroundings. Because an amount of the transmitted light is very small for the light incident from the backlight, the brightness of the backlight must be increased in order to increase the brightness of the LCD device. Consequently, the transmissive liquid crystal display (LCD) device has high power consumption due to the operation of the backlight.

On the other hand, in the reflective type LCD device, sunlight or artificial light is used as a light source of the LCD device. The light incident from the outside is reflected at a reflective plate of the LCD device according to the arrangement of the liquid crystal molecules. Since there is no backlight, the reflective type LCD device has much lower power consumption than the transmissive type LCD device. However, the reflective type LCD device cannot be used in dark surroundings because it depends on an external light source.

Therefore, a transfective LCD device, which can be used both in a transmissive mode and in a reflective mode, has been recently proposed. A related art transfective LCD device will be described hereinafter more in detail.

FIG. 1 is an exploded perspective view illustrating a related art transfective LCD device. The related art transfective LCD device 11 has upper and lower substrates 15 and 21, which are spaced apart from and facing each other, and also has a liquid crystal layer 23 interposed between the upper substrate 15 and the lower substrate 21.

A gate line 25 and a data line 27 are formed on the inner surface of the lower substrate 21. The gate line 25 and the date line 27 cross each other to define a pixel area "P". The pixel area "P" includes a transmissive region "A" and a reflective region "B". A thin film transistor "T" is situated at the crossing of the gate line 25 and the data line 27. In the pixel area "P", a pixel electrode 19 is formed. The pixel electrode 19 is connected to the thin film transistor "T".

Meanwhile, a black matrix 16, which has an opening corresponding to the pixel electrode 19, is formed on the inside of the upper substrate 15, and a color filter 17 corresponding to the opening of the black matrix 16 is formed on the black matrix 16. The color filter 17 is composed of three colors: red (R), green (G) and blue (B). Each color corresponds to each pixel area "P". Subsequently, a common electrode 13 is formed on the color filter 17.

FIG. 2 is a schematic cross-sectional view of a related art transfective LCD device. FIG. 2 indicates a pixel area of the related art transfective LCD device. In the related art transfective LCD device 11, a transparent electrode 19a is formed on the inner surface of a lower substrate 21 and an insulating layer 30 is formed on the transparent electrode 19a. A reflective electrode 19b, which may be a reflector, is formed on the insulating layer 30, and the reflective electrode 19b has a transmissive hole 20 corresponding to a transmissive region "A". As stated above, the lower substrate 21 includes a gate line (not shown), a data line (not shown) and a transistor (not shown) thereon.

An upper substrate 15 is spaced apart from and facing the lower substrate 21. A color filter 17 is formed on the inner surface of the upper substrate 15. A common electrode 13 is formed on the color filter 17. Though not shown in the figure, a black matrix is formed between the upper substrate 15 and the color filter 17.

A liquid crystal layer 23 is disposed between the upper and lower substrates 15 and 21, and molecules of the liquid crystal layer 23 are arranged horizontally with respect to the substrates 15 and 21.

Polarizers (not shown) are arranged on the outer surface of the upper and lower substrates 15 and 21. The transmission axes of polarizers are perpendicular to each other.

A backlight 41 is located under the outside of the lower substrate 21. The backlight 41 is used as a light source of a transmissive mode of the transflective LCD device.

In the transmissive mode, a first light "L1" from the back light 41 penetrates the transparent electrode 19a in the transmissive region "A". Next, while the first light "L1" passes through the liquid crystal layer 23, the transmittance of the first light "L1" is controlled by adjusting the arrangement of the liquid crystal depending on applied voltage.

On the other hand, in a reflective mode, a second light "L2" incident from the outside such as sunlight or artificial light passes through the liquid crystal layer 23 and is reflected at the reflective electrode 19b in a reflective region "B". The second light "L2" passes through the liquid crystal layer 23 again and is emitted. At this time, the amount of emitted second light "L2" is controlled according the arrangement of liquid crystal molecules.

In the transflective LCD device, the color filter 17 is made of a material such as a pigment, which has a very low absorption coefficient of light in a specific wavelength range while it has a high absorption coefficient of light in other ranges. Therefore, light passing through the color filter has a color of R, G, or B according to a property of the pigment.

The first light "L1" and the second light "L2" have a difference in color when emitted. This is because the first light "L1" passes through the color filter only once while the second light "L2" passes through the color filter twice. Accordingly, the second light "L2" has higher color purity than the first light "L1".

Additionally, there is a light glare effect in the transflective LCD device. This happens when a high-intensity external light source is reflected on a liquid crystal display panel. The displayed image is poor due to the glare that occurs as viewed by an observer due to the reflection of light. Therefore, a reflective electrode of an uneven shape and a front scattering film is suggested to increase the brightness along the normal direction and to decrease the light glare effect phenomenon.

FIG. 3 is a schematic cross-sectional view of a transflective liquid crystal display (LCD) device according to a first embodiment of the related art and FIG. 4 is a magnified view of the region "C" of FIG. 3. FIG. 3 shows only a reflective region of the transflective LCD device. In FIGS. 3 and 4, a pixel electrode 19 is formed on an inner surface of a first substrate 21. The pixel electrode 19 is composed of a transflective electrode 19a and a reflective electrode 19b, and an insulating layer 30 is disposed between the transflective and reflective electrodes 19a and 19b. As shown in FIG. 4, the insulating layer 30 has an uneven surface, so that the surface of the reflective electrode 19b is also uneven.

A second substrate 15 is disposed over the first substrate 21 and spaced apart from it. A color filter 17 and a common electrode 13 subsequently are formed on an inner surface of the second substrate 15. Though not shown in the figure, a black matrix is also formed on the inner surface of the second substrate 15.

In the transflective LCD device of FIGS. 3 and 4, the uneven surface of the reflective electrode 19b results in diffused reflection of the incident light "L3" minimizing specular reflection. Accordingly, a brightness along a normal direction of the reflective LCD device increases by changing a reflection angle of light The uneven shape of the passivation layer is initially formed to have a square shape. Subsequently, the passivation layer is cured to form a round shape. Uniform curing of the entire area of the passivation layer is difficult because it is dependent on the curing conditions. The curing temperature may range from about 100° C. to about 200° C. As a result, the uneven shape is not uniform throughout the entire area of the passivation layer. It is difficult to increase a brightness of a reflective LCD device even using a reflective electrode of an uneven shape due to a smaller effective scattering area of the light on the surface of the substrate. Therefore, because the uneven surface is formed through a complicated process, the production yield decreases.

FIG. 5 is a schematic cross-sectional view of a transflective LCD device according to a second embodiment of the related art. FIG. 5 shows only a reflective region of the transflective LCD device. In FIG. 5, a pixel electrode 19, which is composed of a transflective electrode 19a and a reflective electrode 19b, is formed on an inner surface of a first substrate 21. An insulating layer 30 is disposed between the transflective and reflective electrodes 19a and 19b.

A second substrate 15 is disposed over the first substrate 21 and spaced apart from it. A color filter 17 and a common electrode 13 subsequently are formed on an inner surface of the second substrate 15. Though not shown in the figure, a black matrix is also formed on the inner surface of the second substrate 15. A scattering layer 16 is formed on an outer surface of the second substrate 15 and a polarizer 22 is formed on the scattering layer 16.

The scattering layer 16 diffuses not only incident light "L3" but also reflected light "L4", so that the brightness and viewing angle of the reflective mode increase. Besides, a process of forming the scattering layer 16 is simpler than that of forming the reflective electrode 19b having the uneven surface of FIGS. 3 and 4. However, since the scattering layer 16 is formed also in the transmissive area, the contrast ratio of the transmissive mode decreases, so that the quality of picture is poor.

SUMMARY OF THE INVENTION

Accordingly, the present invention is directed to a color filter substrate for a transflective liquid crystal display (LCD) device and a method of manufacturing the same that substantially obviates one or more of problems due to limitations and disadvantages of the related art.

An advantage of the present invention is to provide a color filter substrate for a transflective liquid crystal display (LCD) device that has wide viewing angle and no color difference in transmissive and reflective modes.

Another advantage of the present invention is to provide a method of manufacturing a color filter substrate for a transflective liquid crystal display (LCD) device that has wide viewing angle and no color difference in transmissive and reflective modes.

Another advantage of the present invention is to provide a color filter substrate for a transflective liquid crystal display (LCD) device that prevents the light glare effect and increases the contrast ratio.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a color filter substrate for a transflective liquid crystal display device includes a substrate having a transmissive area and a reflective area; a black matrix on the substrate; a buffer layer having scattering properties on the black matrix, wherein the buffer layer corresponds to the reflective area; a color filter on the buffer layer; and a common electrode on the color filter.

In another aspect, a method of fabricating a color filter substrate for a transflective liquid crystal display (LCD) device includes forming a black matrix on a substrate, wherein the substrate has a transmissive area and a reflective area; forming a buffer layer having scattering properties on the black matrix, wherein the buffer layer corresponds to the reflective area; forming a color filter on the buffer layer; and forming a common electrode on the color filter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, which is illustrated in the accompanying drawings.

Figure 1:
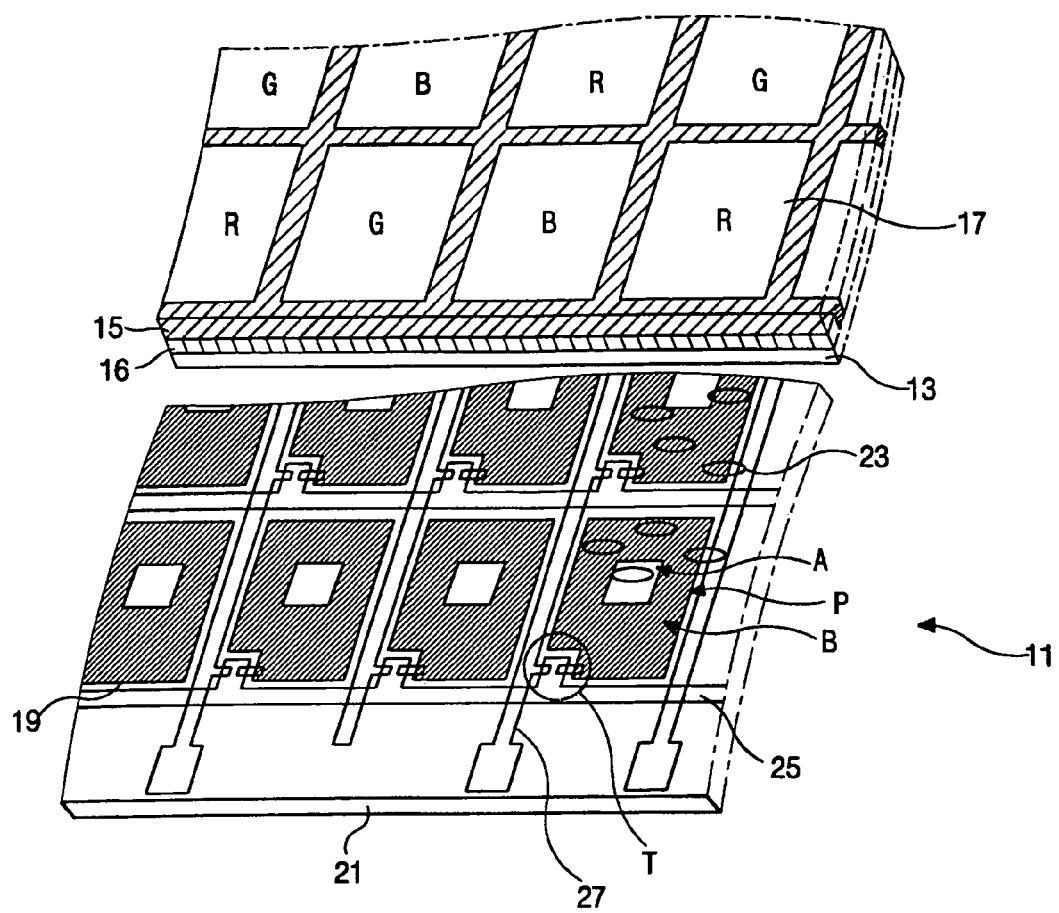
FIG. 1 is an exploded perspective view illustrating a related art transfective LCD device.
Figure 2:
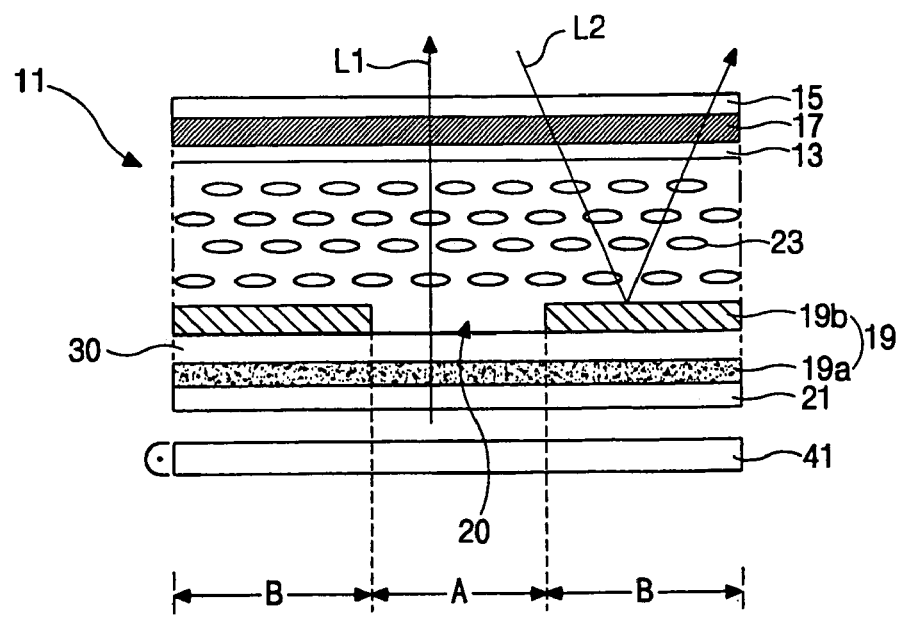
FIG. 2 is a schematic cross-sectional view of a related art transfective LCD device.
Figure 3:
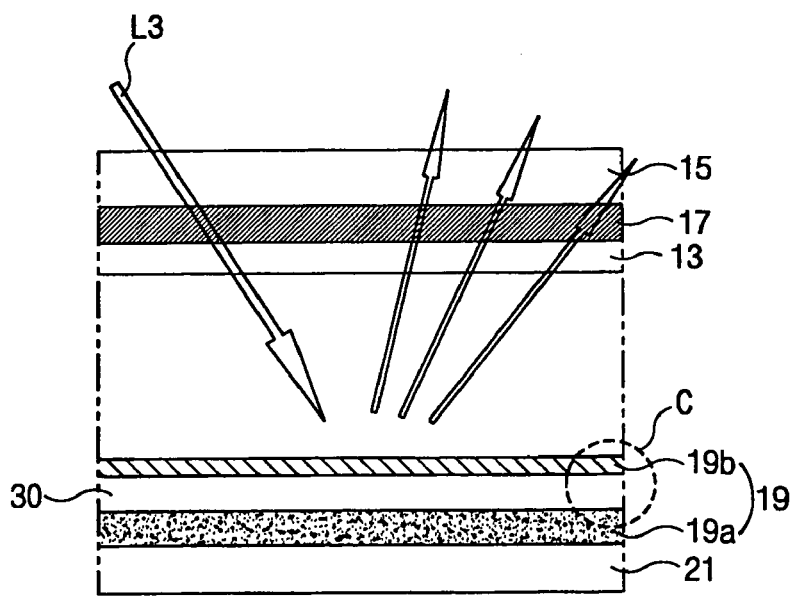
FIG. 3 is a schematic cross-sectional view of a transflective liquid crystal display (LCD) device according to a first embodiment of the related art.
Figure 4:
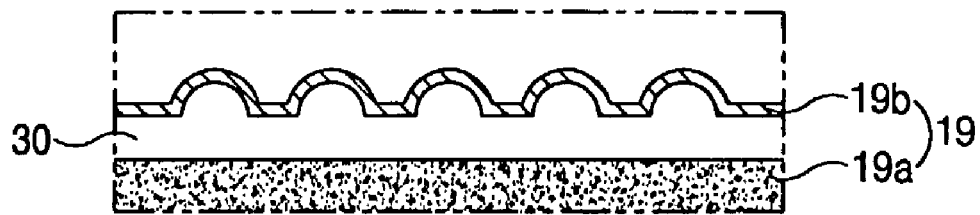
FIG. 4 is a magnified view of the region "C" of FIG. 3.
Figure 5:
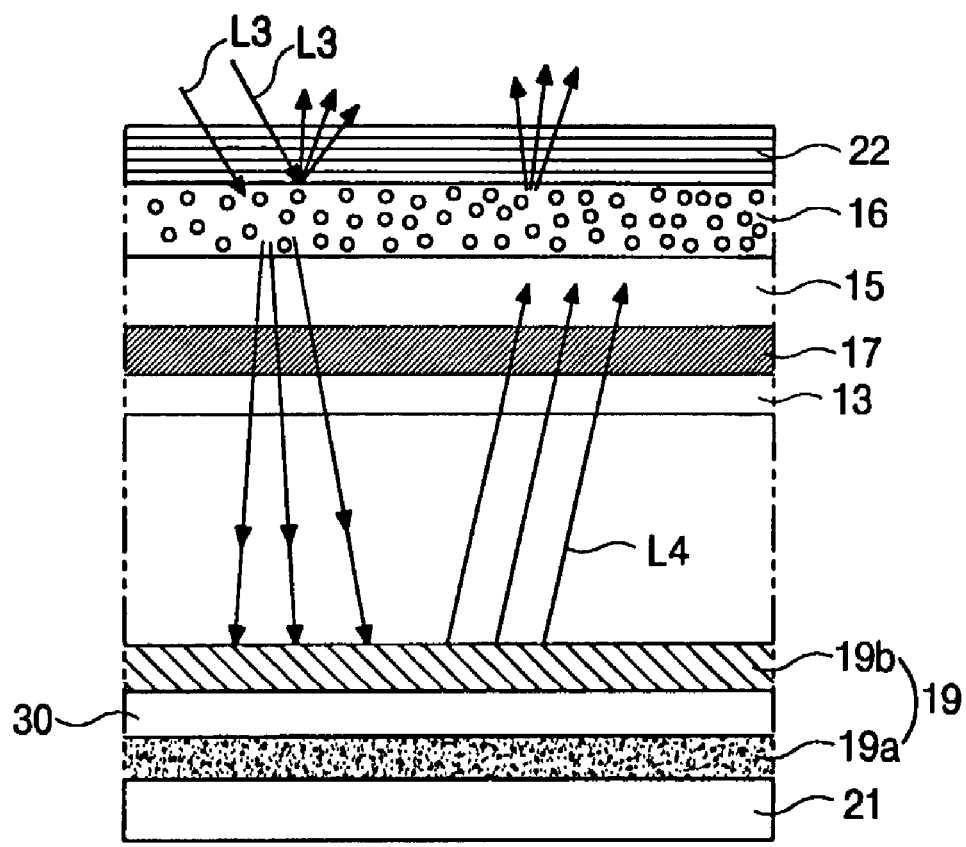
FIG. 5 is a schematic cross-sectional view of a transflective LCD device according to a second embodiment of the related art.
Figure 6A:
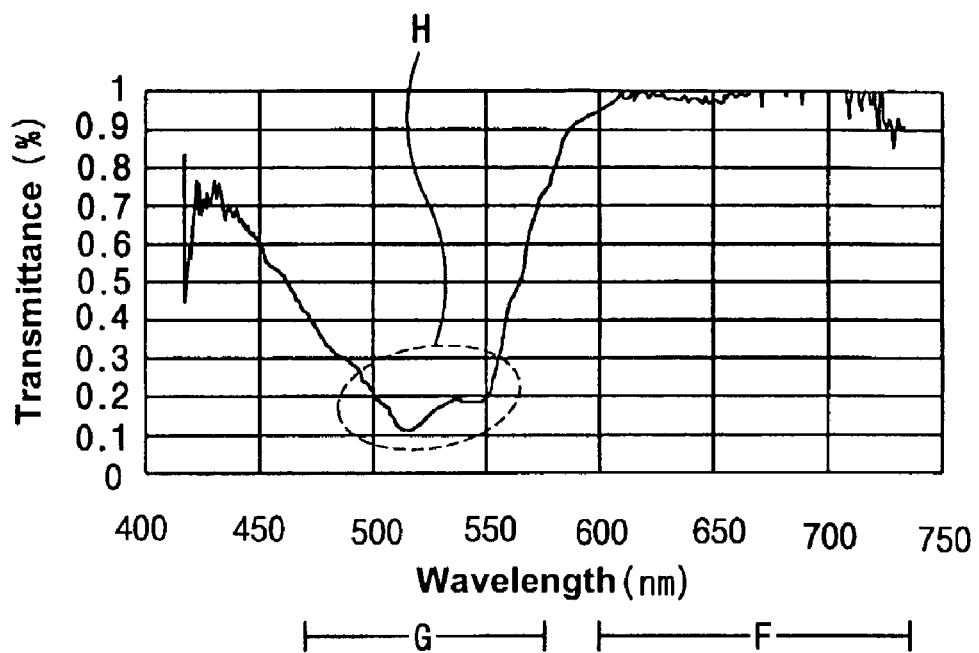
FIGS. 6A and 6B show graphs of transmittance of a red color filter according to the wavelength of light.
Figure 6B:
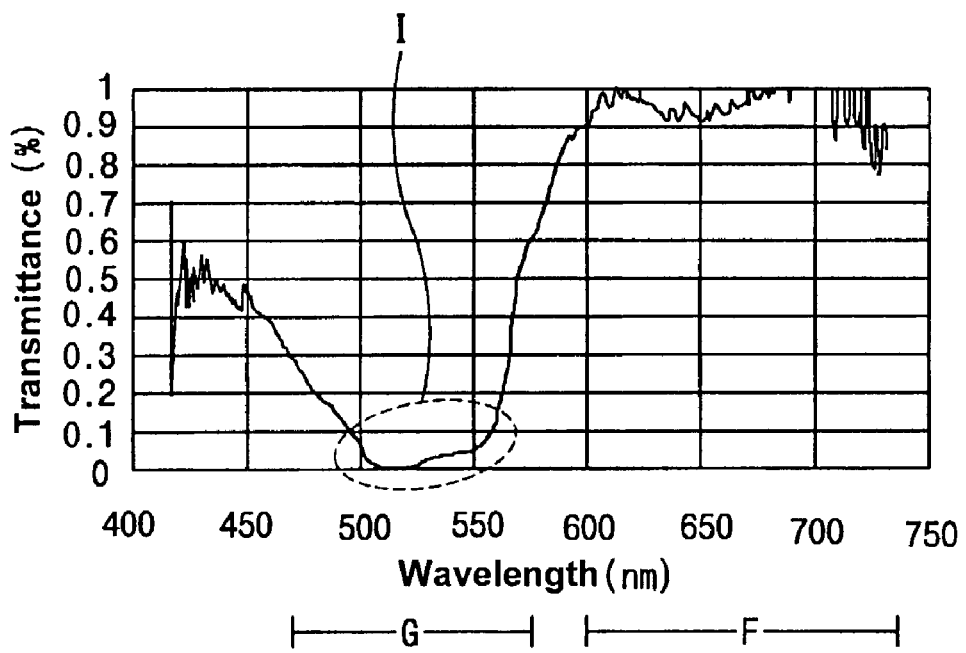

FIGS. 6A and 6B show graphs of transmittance of a red color filter according to the wavelength of light, and the color filter in FIG. 6B is about twice the thickness of the color filter in FIG. 6A.

In FIG. 6A, the light in the wavelength range of red "F" has transmittance of nearly one while the light in other ranges "G" of about 470 to 570 nm has transmittance "H" of about 0.1 to about 0.3. Therefore, red light passing through the color filter is mixed with the light in the band of about 470 to about 570 nm, i.e., green light. The red light has low color purity.

Meanwhile, in FIG. 6B, the thickness of the color filter is about twice the thickness of the color filter of FIG. 6A. Here, the light in the wavelength range of red "F" has transmittance of nearly one, also. On the other hand, the light in other ranges "G" has transmittance "I" of nearly zero. Accordingly, the light in FIG. 6B has higher color purity than that of FIG. 6A.

The thicker the color filter is, the higher the color purity of the emitted light.

FIGS. 7A to 7D show a method of fabricating a color filter substrate for a transflective liquid crystal display (LCD) device according to the present invention.

Figure 7A:
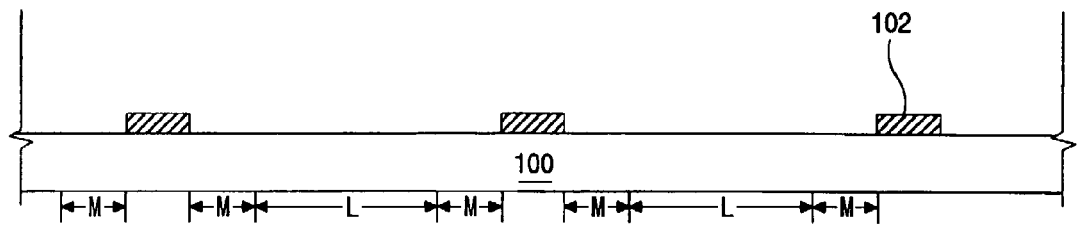
FIGS. 7A to 7D show a method of fabricating a color filter substrate for a transflective liquid crystal display (LCD) device according to the present invention.

As shown in FIG. 7A, a black matrix 102 is formed on a substrate 100, which has a reflective area "M" and a transmissive area "L". The black matrix 102 has an opening corresponding to two reflective areas "M" and one transmissive area "L", which is located between two reflective areas "M". The black matrix 102 is made of black resin and the substrate 100 is made of a transparent material such as glass.

Figure 7B:
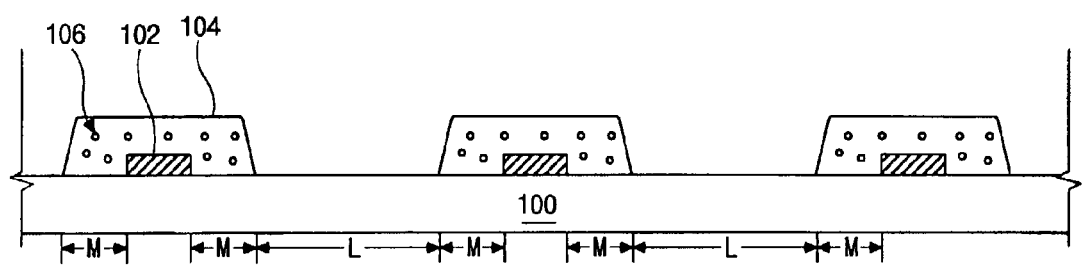

In FIG. 7B, an inorganic material, which includes a plurality of scattering source material 106, is coated or deposited on the substrate 100 having the black matrix 102, and then is patterned through a process such as photolithography. Thus, a buffer layer 104 is formed in the reflective area "M". The buffer layer 104 also covers the black matrix 102. The buffer layer 104 is made of benzocyclobutene (BCB) or acrylic resin. The scattering source material 106 causes diffused reflection of light. The refractive index of the buffer layer is different from a refractive index of the scattering source material.

Figure 7C:
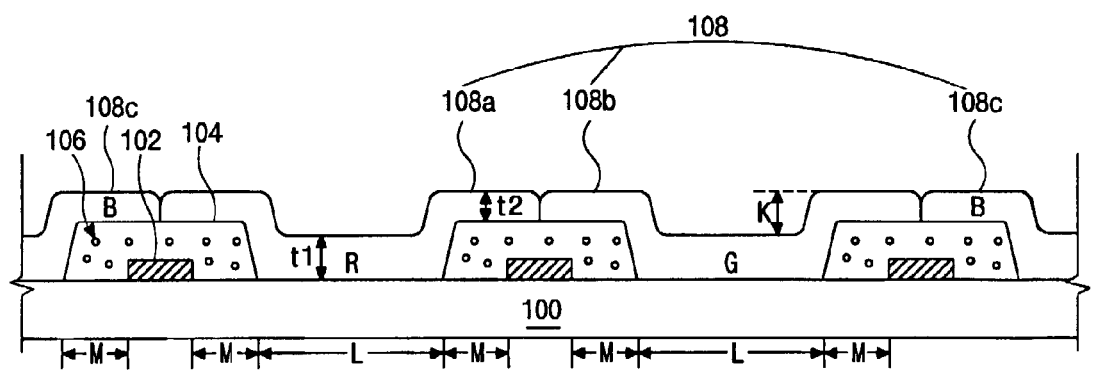

Next, in FIG. 7C, a photosensitive resin is coated and patterned; thereby a color filter 108 is formed on the buffer layer 104. The color filter 108 is composed of three sub-color filters 108a, 108b, and 108c of red (R), green (G), and blue (B), which are subsequently formed. The color filter 108 has two types of thickness. That is, a first thickness "t1" in the transmissive area "L" differs from a second thickness "t2" in the reflective area "M". The first thickness "t1" is ideally about twice as long as the second thickness "t2" since in the reflective mode, incident light passes through the color filter twice, but, in the transmissive mode, incident light passes through the color filter once.

A step "K" is formed between the transmissive area "L" and the reflective area "L" in the color filter 108 due to the buffer layer 104.

Figure 7D:
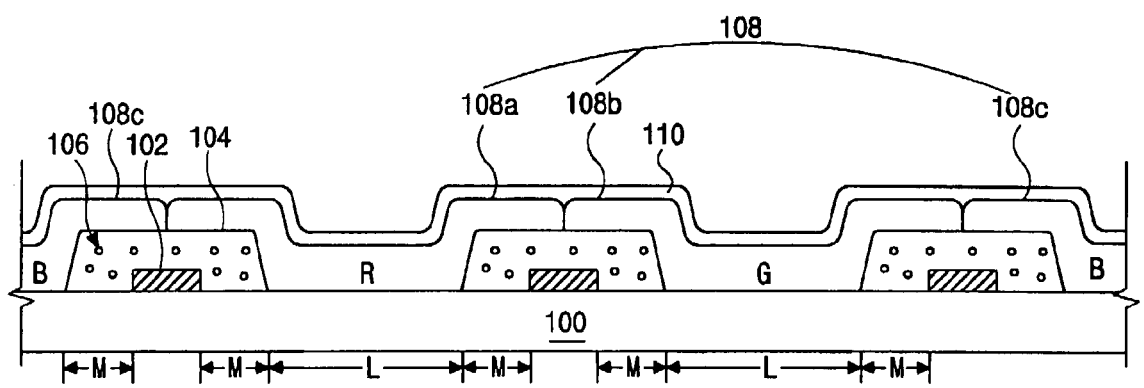

In FIG. 7D, a common electrode 110 is formed on the color filter 108 by depositing a transparent conductive material by a method such as a sputtering and patterning it. The common electrode 110 is made of Indium-Tin-Oxide (ITO) or Indium-Zinc-Oxide (IZO).

As the color filter 108 in the transmissive area "L" is about twice thickness of the color filter 108 in the reflective area "M", the emitted light of the transmissive area "L" has similar color purity to that of the reflective area "M". Therefore, the emitted light of the transmissive area "L" is different in color from the emitted light of the reflective area "M". Additionally, since the emitted light is diffused due to the scattering source material provided only in the reflective area, the brightness in the direction of an observer is improved and the light glare effect is prevented in the reflective area, contrast ratio is not decreased in the transmissive area. Therefore, brightness and contrast ratio are increased in the transflective liquid crystal display device.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A color filter substrate for a transfective liquid crystal display device, comprising:
   a substrate having a transmissive area and a reflective area;
   a buffer layer on the substrate, the buffer layer corresponding to the reflective area and having scattering source materials;
   a color filter on the buffer layer; and
   a common electrode on the color filter.

2. The color filter substrate according to claim 1, further comprising a black matrix on the substrate.

3. The color filter substrate according to claim 1, wherein the color filter of the transmissive area is thicker than the color filter of the reflective area.

4. The color filter substrate according to claim 3, wherein the color filter of the transmissive area is about twice the thickness of the color filter of the reflective area.

5. The color filter substrate according to claim 1, wherein the buffer layer is made of one of benzocyclobutene (BCB) and acrylic resin.

6. The color filter substrate according to claim 1, wherein a refractive index of the buffer layer is different from a refractive index of the scattering source material.

7. The color filter substrate according to claim 1, wherein the color filter is composed of three sub-color filters of red, green, and blue.

8. The color filter substrate according to claim 1, wherein the black matrix is made of a black resin.

9. A method of fabricating a color filter substrate for a transflective liquid crystal display (LCD) device, comprising:
providing a substrate having a transmissive area and a reflective area;
forming a buffer layer on the substrate, the buffer layer corresponding to the reflective area and having scattering source materials;
forming a color filter on the buffer layer; and
forming a common electrode on the color filter.

10. The method according to claim 9, further comprising forming a black matrix on the substrate.

11. The method according to claim 10, wherein the black matrix is made of a black resin.

12. The method according to claim 9, wherein forming the color filter includes providing a color filter of the transmissive area thicker than the color filter of the reflective area.

13. The method according to claim 12, wherein forming the color filter includes providing a color filter of the transmissive area about twice the thickness of the reflective area.

14. The method according to claim 9, wherein the buffer layer is made of one of benzocyclobutene (BCB) and acrylic resin.

15. The method according to claim 9, wherein a refractive index of the buffer layer is different from a refractive index of the scattering source material.

16. The method according to claim 9, wherein forming a color filter includes coating a photosensitive color resin and patterning the photosensitive color resin.

17. The method according to claim 9, wherein forming a common electrode includes depositing a transparent conductive material by sputtering and patterning the transparent conductive material.

18. The method according to claim 9, wherein the color filter is composed of three sub-color filters of red, green, and blue.

19. A color filter substrate for a transfective liquid crystal display device, comprising:
a substrate having a transmissive area and a reflective area;
a buffer layer on the reflective area of the substrate;
scattering source materials arranged within the buffer layer;
a color filter on the buffer layer; and
a common electrode on the color filter.

20. The color filter substrate of claim 19, wherein
the buffer layer has a first refractive index, and
the scattering source materials have a second refractive index different from the first refractive index.

* * * * *